US012629927B2

(12) United States Patent
Marijsse et al.

(10) Patent No.: US 12,629,927 B2
(45) Date of Patent: May 19, 2026

(54) POLYMER FLOOR ELEMENT

(71) Applicant: FLOORING INDUSTRIES LIMITED, SARL, Bertrange (LU)

(72) Inventors: Frederik Marijsse, Heestert (BE); Kristof Van Vlassenrode, Deinze (BE)

(73) Assignee: UNILIN BV, Wielsbeke (BE)

( * ) Notice: Subject to any disclaimer, the term of this patent is extended or adjusted under 35 U.S.C. 154(b) by 470 days.

(21) Appl. No.: 17/786,307

(22) PCT Filed: Nov. 30, 2020

(86) PCT No.: PCT/IB2020/061272
§ 371 (c)(1),
(2) Date: Jun. 16, 2022

(87) PCT Pub. No.: WO2021/123978
PCT Pub. Date: Jun. 24, 2021

(65) Prior Publication Data
US 2023/0024891 A1 Jan. 26, 2023

Related U.S. Application Data

(60) Provisional application No. 62/950,561, filed on Dec. 19, 2019.

(30) Foreign Application Priority Data

Dec. 17, 2019 (BE) .................................... 2019/5917

(51) Int. Cl.
B32B 27/30 (2006.01)
B32B 5/18 (2006.01)
(Continued)

(52) U.S. Cl.
CPC .............. B32B 27/304 (2013.01); B32B 5/18 (2013.01); B32B 7/06 (2013.01); B32B 7/12 (2013.01);
(Continued)

(58) Field of Classification Search
CPC ... E04F 15/0215; E04F 15/105; E04F 15/107; B32B 2307/546; B32B 2307/718;
(Continued)

(56) References Cited

U.S. PATENT DOCUMENTS 4,333,987 A * 6/1982 Kwart ...................... D06N 3/08
427/520
5,578,363 A 11/1996 Finley et al.
(Continued)

FOREIGN PATENT DOCUMENTS

JP H06158837 A 6/1994
JP 2018003508 A 1/2018
(Continued)

OTHER PUBLICATIONS

Handbook of Vinyl Formulation Second Edition. A John Wiley & Sons, Inc., Publication. Chapter 2, pp. 13-56. (Year: 2008).*
(Continued)

*Primary Examiner* — Blaine Copenheaver
(74) *Attorney, Agent, or Firm* — Workman Nydegger

(57) ABSTRACT

A polymer floor element includes a decorative top layer on a substrate made of polymer. The floor element has a rectangular or square surface, for which it is valid that for a strip of the floor element with a first point Q defined as a vertex of the strip, and a point P at a distance of 40 cm with respect to Q along a side of the strip, suspended over a rod with diameter 2 cm with its side on which P and Q are defined, perpendicular to the axis of the rod, so that P is located in the vertical direction at the highest point where the floor element touches the rod. The strip, with point Q along one side, hangs down from the rod under the strip's own weight; the straight line PQ intersects the vertical through P at an angle less than 15°.

13 Claims, 2 Drawing Sheets

(51) Int. Cl.

| | |
|---|---|
| *B32B 7/06* | (2019.01) |
| *B32B 7/12* | (2006.01) |
| *B32B 27/08* | (2006.01) |
| *E04F 15/02* | (2006.01) |
| *E04F 15/10* | (2006.01) |

(52) U.S. Cl.

CPC .......... *B32B 27/08* (2013.01); *E04F 15/0215* (2013.01); *E04F 15/105* (2013.01); *E04F 15/107* (2013.01); *B32B 2266/0221* (2013.01); *B32B 2266/0235* (2013.01); *B32B 2307/546* (2013.01); *B32B 2307/718* (2013.01); *B32B 2419/04* (2013.01); *B32B 2471/00* (2013.01)

(58) Field of Classification Search

CPC ........ B32B 2471/00; B32B 2266/0221; B32B 2266/0235; B32B 2419/04; B32B 2307/51; B32B 27/304; B32B 5/18; B32B 7/06; B32B 7/12; B32B 27/08

See application file for complete search history.

(56) References Cited

U.S. PATENT DOCUMENTS 5,942,300 A * 8/1999 Lukowski, Sr. .......... B32B 7/12
                                       428/44

| | | | | |
|---|---|---|---|---|
| 2006/0003148 A1* | 1/2006 | Zwynenburg | ......... | E04F 15/187 |
| | | | | 428/156 |
| 2008/0145673 A1* | 6/2008 | Bonnard | .................. | C08J 7/043 |
| | | | | 428/483 |
| 2016/0168868 A1* | 6/2016 | Song | ..................... | E04F 15/206 |
| | | | | 156/60 |
| 2016/0193805 A1 | 7/2016 | Van Der Zijpp | | |
| 2018/0043666 A1* | 2/2018 | Bennett | ..................... | E04C 2/22 |
| 2018/0134016 A1* | 5/2018 | Burns | ....................... | B32B 7/02 |
| 2018/0283014 A1 | 10/2018 | Hodgkins et al. | | |
| 2019/0242138 A1* | 8/2019 | Schulte | ................... | B32B 27/08 |
| 2022/0063234 A1* | 3/2022 | AbdulBaki | .............. | B32B 3/16 |

FOREIGN PATENT DOCUMENTS

| | | |
|---|---|---|
| RU | 2665523 C2 | 8/2018 |
| WO | 2011153916 A1 | 12/2011 |
| WO | 2020075111 A1 | 4/2020 |

OTHER PUBLICATIONS

Search Report from corresponding Belgian Application No. BE2019/5917, Sep. 3, 2020.

International Search Report from PCT Application No. PCT/IB2020/061272, Mar. 11, 2021.

* cited by examiner

100

L

D

B 201
202
203
} 210

204
205
206
} 211

P

300

100

110
151
152

111

α

112

150

Q

POLYMER FLOOR ELEMENT

BACKGROUND

The invention relates to polymer floor elements and floor covering comprising said polymer floor elements.

Polymer floor elements are known in the prior art. They are often large surfaces, such as wall-to-wall vinyl, which are glued to the screed with a permanent glue. If damaged or worn, the whole surfaces have to be removed again, which is expensive and labor-intensive.

Other polymer floor elements are polymer planks, for example made of PVC, which are coupled together by means of a coupling mechanism on the sides, so as to provide a larger area of floor covering. Here too, restoration of damaged or worn floor elements is a challenge.

Thus, there is a need for a more flexible, layable type of floor covering, which allows the floor elements that provide parts of a larger area to be replaced quickly.

SUMMARY

According to a first independent aspect of the invention, a polymer floor element is provided, the floor element comprising a decorative top layer on a substrate made of polymer, the floor element has a rectangular or square surface with a longest side less than 3.0 m and greater than 0.4 m, or at least 0.8 m, for which it is valid that for a strip of the floor element with a first point Q defined as a vertex of the strip, and a point P at a distance of 40 cm with respect to Q along a side of the strip, suspended over a rod with a diameter of 2 cm with its side on which P and Q are defined, perpendicular to the axis of the rod, so that P is located in the vertical direction at the highest point where the floor element touches the rod; and the strip, with point Q along one side, hangs down from the rod under the strip's own weight;

the straight line PQ intersects the vertical through P at an angle less than 15°.

It is clear that measurement takes place after the strip has had time to come to a stable hanging state. This may take a few minutes. Measurement is carried out in a conditioned environment of 23° C. and 50% RH. Preferably, measurement is carried out exactly ten minutes after the strip is suspended. After ten minutes it can be assumed that the floor element has reached its stable hanging state, or almost its stable hanging state. Any deformation that might still occur after ten minutes is not relevant for estimation of the flexible character of the floor element.

The side where P and Q are located thus makes contact with the rod. The length of the strip hanging over the rod is thus 40 cm.

Preferably the angle between the straight line PQ and the vertical through P is less than 11°.

It is obvious that for measurement we start from a fixed position of the strip on the rod. For this purpose the strip in question may for example be firmly fixed or clamped on the rod at the location of point P. According to another possibility, it may be ensured that the strip in question is suspended symmetrically on the aforementioned rod in such a way that the portions of the strip that extend along either side of point P are identical, namely amount to 40 cm in each case. According to yet another possibility, it may be ensured that the other end of the strip P, namely the end that, seen from point Q, extends farther than point P, is supported horizontally, for example because this end lies on a table, wherein the aforementioned rod is then located at the edge of the table.

It is clear, moreover, that it is not excluded that for floor elements with a limited or extreme length, the aforementioned measurement may be carried out with a floor element that has an identical structure, but a more suitable length for the measurement. Thus, for example, for each floor element it would be possible to select an equivalent floor element with a length of 80 cm, such that the measurement can be carried out on the basis of the symmetrical suspension described above.

Floor elements of this kind, which are extremely flexible, have the advantage that the floor elements can be laid very easily on a substrate provided with a nonpermanent glue (or tackifier). They display little or no tendency to curl upward once laid, and have no need for permanent glue to keep them in place. A nonpermanent glue is sufficient. Thus, floor elements of this kind can also be removed easily from a floor covering that is made up from said floor elements laid side by side.

The top layer typically comprises a decorative layer, a wearing layer and optionally a coating on the outer side.

According to some embodiments the floor element may have a rectangular or square surface with the short side less than 0.5 m and greater than 0.08 m.

Preferably the long side is in the range from 0.4 to 2.5 m, such as in the range from 0.4 to 2.0 m. The short side is preferably in the range from 0.1 to 0.45 m, such as in the range from 0.15 to 0.45 m.

Floor elements with these dimensions are easy to handle and manipulate.

According to some embodiments, the floor element may have a weight per unit area between 1500 g/m² and 3000 g/m².

Preferably the weight per unit area is selected between 1900 g/m² and 2600 g/m², such as between 2050 g/m² and 2500 g/m².

Floor elements with said weights per unit area have the advantage that their weight helps in more stable laying on a substrate, certainly if this is provided with nonpermanent glue.

According to some embodiments the floor element may have a thickness between 1 mm and 8 mm.

According to some embodiments the polymer may be polyvinyl chloride.

PVC refers to polyvinyl chloride or a copolymer of vinyl chloride and vinyl acetate. PVC preferably has a K-value between 50 and 90.

Preferably, flexible polymer, such as flexible PVC, is used for the invention. In the context of the present invention, flexible polymer, such as flexible PVC, means a polymer that comprises 40 or more then 40 phr plasticizers. Semi-rigid or semi-flexible polymers, for example semi-flexible or semi-rigid PVC, means a polymer that comprises between 10 and 40 phr plasticizers, whereas rigid polymers, such as rigid PVC, comprise less than or exactly 10 phr plasticizer.

Generally, in the context of the present invention, plasticizers are inter alia esters of carboxylic acids (for example esters of phthalic acid, iso- or terephthalic acid, trimellitic acid and adipic acid), for example diisononyl phthalate (DINP), dioctyl terephthalate (DOTP), diisononyl-1,2-cyclohexanedicarboxylate (DINCH), esters of phosphoric acid, for example triaryl or trialkaryl phosphates, for example tricresyl phosphate, chlorinated or unchlorinated hydrocarbons, ethers, polyesters, polyglycols, sulfonamides, or combinations thereof.

According to some embodiments the floor element may be sheet vinyl.

The sheet vinyl used in this aspect of the invention is typically built up in layers, and comprises an optional backlayer of flexible polymer, preferably PVC, one or more flexible or semi-rigid PVC layers, on or in which possibly at least one reinforcing layer is attached or embedded, and a finishing layer typically comprising a decorative layer, a wearing layer and optionally a coating on the outer side.

Optionally the flexible or semi-rigid PVC layer or layers comprise a reinforcing layer, for example a textile reinforcing layer, for example a glass-fiber fleece or cloth.

The flexible or semi-rigid PVC layer may comprise fillers between 10 and 70 wt %.

Fillers may be inter alia glass fibers, calcium hydroxide (slaked lime), calcium carbonate and calcium hydrogen carbonate, and/or $CaMg(CO_3)_2$, talc, or also lightweight fillers such as hollow microspheres (Expancel). The aforementioned percentage by weight (wt %), and unless stated otherwise, each percentage by weight stated in this document, is expressed as the weight of the filler relative to the weight of the whole polymer formulation, if applicable PVC formulation, in which the filler is present.

Moreover, the polymer of the first and/or if applicable second polymer layer may comprise additives such as pigments and dyes, preservatives, antifungals, thermal stabilizers, UV stabilizers, blowing agents, viscosity controllers, and the like.

The optional backlayer consists of flexible PVC and typically has a thickness of more than 0.5 mm, for example between 0.5 mm and 5 mm, for example between 0.75 mm and 2.5 mm. The material of which this backlayer consists comprises, besides PVC, also fillers (up to 60 wt % relative to the whole PVC material, for example about 50 wt %) and additives, and preferably more than 40 phr plasticizer, more specifically more than 50 phr plasticizer. The backlayer may or may not be foamed, and may have a density between 0.3 $g/cm^3$ and 1.9 $g/cm^3$.

The flexible or semi-rigid PVC layer or layers, on or in which optionally a reinforcing layer is attached or embedded, comprises or is preferably a fibrous web that is impregnated with PVC. The PVC used to impregnate the glass-fiber fleece partly or preferably completely is preferably flexible PVC. The PVC comprises, besides the polymer, also fillers (up to for example 75 wt % or up to 50 wt % relative to the whole PVC material, for example up to about 40 wt %) and additives, and preferably more than 40 phr plasticizer, more specifically more than 50 phr plasticizer. The thickness of this layer may be up to 0.6 mm but is preferably between 0.20 mm and 0.40 mm, such as about 0.30 mm. The density of the PVC used is preferably less than 1.9 $g/cm^3$, for example such as between 1.4 $g/cm^3$ and 1.7 $cm^3$, for example between 1.5 $g/cm^3$ and 1.6 $g/cm^3$. As fleece, preferably a glass-fiber fleece (nonwoven) is used that has about the same thickness as this layer. The preferred fleece has a thickness of 0.3 mm and a weight per unit area of 35 $g/m^2$.

The flexible or semi-flexible PVC of the sheet vinyl may be applied as a layer by means of PVC plastisol, with a first PVC layer being PVC plastisol impregnated in the reinforcing layer, and one or more layers of PVC plastisol applied on this impregnated reinforcing layer.

The PVC layer or layers may or may not be foamed, and in the foamed state preferably to a foam with closed cells. This foam may be foamed mechanically (for example by introducing gas or air bubbles), by chemical foaming with a blowing agent (for example azodicarbonamide or ADCA), or by incorporation of expandable or expanded cells (for example EXPANCELL™).

The density of the PVC is preferably in the range from 0.5 to 2.1 kg/l, for example between 0.8 to 2.0 kg/l.

The finishing layer typically comprises a decorative layer, a wearing layer and optionally a coating on the outer side.

The decorative layer possibly comprises flexible PVC with a thickness of between 0.09 mm and 0.6 mm, for example between 0.4 mm and 0.6 mm. It may be a PVC layer (for example a film), which is printed with a decorative pattern. The PVC used may be flexible PVC. Besides polymer, this PVC layer also comprises additives and fillers (up to 50 wt % relative to the whole PVC composition), and plasticizers preferably more than 40 phr, more specifically more than 50 phr plasticizer. The PVC may or may not be foamed, but is preferably foamed. If a foamed PVC material is used, the PVC layer may have a density under 1 $g/cm^3$, such as between 0.5 and 0.8 $g/cm^3$. In the case of unfoamed PVC, the density is preferably between 1 $g/cm^3$ and 1.9 $g/cm^3$, such as between 1.3 $g/cm^3$ and 1.6 $g/cm^3$. The layer may be supplied as film, whether or not preprinted, as emulsion or (micro-) suspension polymerization layers, by calendering or as plastisol layer.

Optionally the decorative layer is a printed layer, printed directly on the flexible or semi-rigid PVC layer. This is especially applicable if the flexible or semi-rigid PVC layer is provided with a PVC layer (whether or not foamed), on top of a reinforcing layer of glass-fiber fleece impregnated with PVC.

On this decorative layer, a wearing layer is provided, which may be selected in thickness for example between 0.15 mm and 1.0 mm, for example between 0.2 mm and 0.55 mm. It may preferably be a flexible or semi-rigid PVC layer, for example a film. Preferably, no fillers are added or used, and the layer is transparent. Besides polymer, this PVC layer also comprises additives and plasticizers, preferably more than 20 phr, more specifically more than 30 phr plasticizer. Plasticizers up to 40 phr may be provided in this PVC. Preferred ranges for plasticizers are 20 to 45 phr, more preferably 35 to 40 phr. The PVC may have a density preferably between 1 $g/cm^3$ and 1.5 $g/cm^3$, such as between 1.2 $g/cm^3$ and 1.3 $g/cm^3$.

The wearing layer is optionally provided with wearing particles, for example $Al_2O_3$ particles. The PVC is typically free from fillers. The layer may be supplied as film or as emulsion or (micro) suspension polymerization layers, by calendering or as plastisol layer.

As finishing layer, the sheet vinyl may further comprise a varnish coat or coating on top of the wearing layer, which consists of polyurethane (PU), for example a thermal or UV curing PU layer. The thickness may be up to 20, even 30 μm, but is preferably about 10 μm thick.

According to a second independent aspect of the invention, a floor element is provided, being a sheet vinyl floor element, the floor element has a rectangular or square surface with a longest side less than 3.0 m and greater than 0.4 m.

According to some embodiments, the floor element may have a rectangular or square surface with the short side less than 0.5 m and greater than 0.08 m.

Preferably the long side is in the range from 0.4 to 2.5 m, such as in the range from 0.4 to 2.0 m. The short side is preferably in the range from 0.1 to 0.45 m, such as in the range from 0.15 to 0.45 m.

According to a third independent aspect of the invention, a polymer floor element is provided comprising a decorative top layer on a substrate made of polymer, the floor element has a polygonal surface with a longest distance between two points on the surface greater than 0.1 m and less than 3.0 m, for which it is valid that for a strip of the floor element with a first point Q defined as a vertex of the strip, and a point P at a distance of 40 cm with respect to Q along a side of the strip, suspended over a rod with a diameter of 2 cm with its side on which P and Q are defined, perpendicular to the axis of the rod, so that P is located in the vertical direction at the highest point where the floor element touches the rod; and the strip, with point Q along one side, hangs down from the rod under the strip's own weight;

the straight line PQ intersects the vertical through P at an angle less than 15°.

It is obvious that measurement of the aforementioned angle, and in particular the suspension or fastening of the strip on the rod, may take place in a similar manner as discussed above in the context of the first aspect of the invention.

According to some embodiments, the floor element is sheet vinyl.

According to a fourth independent aspect of the invention, a floor element is provided, being a sheet vinyl floor element, the floor element has a polygonal surface with a longest distance between two points on the surface greater than 0.1 m and less than 3.0 m.

The floor elements according to this third or fourth aspect may be squares with sides for example between 10 cm and 100 cm. The floor elements according to this third or fourth aspect may be rectangles with a short side for example between 5 cm and 60 cm, and a long side for example between 20 cm and 200 cm. The floor elements according to this third or fourth aspect may be hexagons with sides for example between 5 cm and 20 cm. The floor elements according to this third or fourth aspect may be right-angled triangles with short cathetus for example between 15 cm and 60 cm and long cathetus between 20 and 60 cm. The floor elements according to this third or fourth aspect may be trapeziums or parallelograms with slanting side for example between 5 cm and 20 cm, and a longest side for example between 20 cm and 60 cm.

The floor elements of this third or fourth aspect may further have one or more features as described for the floor elements according to the first or second aspect of the invention.

According to a fifth independent aspect of the invention, a floor covering is provided comprising a plurality of floor elements according to the first, second, third or fourth aspect of the invention.

According to some embodiments, the floor elements may be glued on a subfloor.

This may be done with permanent or nonpermanent glue.

According to some embodiments, the floor elements may be glued on a subfloor by means of a nonpermanent glue.

A subfloor is typically a product that may be supplied in sheet or roll form, and is applied under the floor covering elements. Its function is mainly to mask irregularities on the supporting floor structure, and optionally, also to endow the floor covering with acoustic or sound or heat insulating properties.

According to some embodiments, the subfloor may be a foamed polymer subfloor.

The subfloor comprises a foamed polymer layer and preferably at least one reinforcing layer. This at least one reinforcing layer of the subfloor may be a glass-fiber fleece or glass-fiber cloth.

The foamed polymer layer of the subfloor may be a polymer layer of PVC, PU (polyurethane), PE (polyethylene) or PVB (polyvinyl butyral).

The optional at least one reinforcing layer preferably has a weight per unit area of at least 15 $g/m^2$, and preferably a weight per unit area of at least 25 $g/m^2$. Optionally, two or more such reinforcing layers are provided in the subfloor. The density of the subfloor is preferably between 1000 and 3000 $g/m^3$, such as between 1400 and 2600 $g/m^3$.

According to some embodiments, the floor elements may be glued to the supporting floor structure.

It may be glued with permanent or nonpermanent glue.

According to some embodiments, the floor elements may be glued to the supporting floor structure by means of a nonpermanent glue.

The nonpermanent glue is preferably a water-based, solvent-free, acrylic resin dispersion glue.

It should also be noted that instead of the measurement described for the first and second aspect, a flexibility test may also be carried out as described in ASTM F137. Namely a test wherein the flexibility of a specimen is determined by bending a strip of the material in question round cylinders (mandrels) of different sizes. The cylinders have a diameter from 6 mm to 120 mm. The strip is bent 180° round the cylinder and then investigated for the development of defects, such as cracks or fractures. If there are no defects, the procedure is repeated with a cylinder of smaller diameter. The procedure is continued until the material displays defects such as fractures and cracks or until the smallest cylinder is used in the procedure. When this measurement is carried out, the floor elements preferably display the property that they pass the test with a cylinder with a diameter of 6 mm, namely do not display any defects even when they are tested using the smallest cylinder.

It is clear from the foregoing that the present invention, according to a particular independent aspect, also relates to a polymer floor element comprising a decorative top layer on a substrate made of polymer, wherein the floor element has a rectangular or square surface with a longest side less than 3.0 m and greater than 0.4 m, wherein said floor element passes the flexibility test according to ASTM F137 with a cylinder of 6 mm.

The floor element of the aforementioned particular independent aspect may further display the properties of the preferred embodiments of the aforementioned first and/or second aspect, without necessarily having to satisfy the measurement described there of the angle that the straight line PQ makes with the vertical.

Moreover, it is clear that the floor element from the aforementioned aspects is preferably built up as a cushion vinyl floor covering, which is usually supplied in rolled-up form, but, in the context of the present invention, with unusual relatively limited dimensions. Cushion vinyl of this kind preferably satisfies the requirements of ISO 26986 in connection with cushioned or expanded PVC floor coverings. Said floor element preferably comprises an optional backlayer of flexible polymer, preferably PVC, one or more flexible or semi-rigid PVC layers, on or in which possibly at least one reinforcing layer is attached or embedded, and a finishing layer typically comprising a decorative layer, a wearing layer and optionally a coating on the outer side.

Optionally the flexible or semi-rigid PVC layer or layers comprise a reinforcing layer, for example a textile reinforcing layer, for example a glass-fiber fleece or cloth. Preferably said floor element has a thickness between 1 and 8 mm, and better still between 2 and 4 mm, or between 2.5 and 3.6 mm.

The invention further relates, according to an independent aspect, to a packaging unit that contains several of the aforementioned floor elements. The packaging unit preferably comprises at least one case, for example made of cardboard, which envelops the floor elements in question. Preferably a packaging unit comprises 6 to 20 floor elements, or better still 8 to 14. Preferably the floor elements in the packaging unit are stacked on one other. Preferably each of the floor elements has the same shape and dimensions, for example an elongated shape with a length between 80 cm and 140 cm, and a width between 15 and 22 cm.

According to any one of the aforementioned aspects, the floor elements preferably have a decorative layer that comprises a print with a design that is not repeated completely or partially over the length of the floor element in question, or in other words a design that is free from repetitions, or a design that is unique at each point along the length of the floor element in question. Preferably the design forms a representation of one single wooden plank over the entire surface of the floor element. According to an alternative, the design forms a representation of one or more slabs or tiles, optionally with imitation joints between and/or around them, over the entire surface of the floor element.

The independent and dependent claims present specific and preferred features of the embodiments of the invention. Features of the dependent claims may be combined with features of the independent and dependent claims, or with features described above and/or hereunder for the different aspects of the invention, and in any suitable manner such as would be obvious for a person skilled in the art.

The aforementioned and other features, properties and advantages of the present invention will be explained by means of the following examples of embodiments, optionally in conjunction with the drawings.

The description of these examples of embodiments is given as explanation, without the intention of limiting the scope of the invention. The reference numbers in the description given hereunder refer to the drawings. The same reference numbers in optionally different figures refer to identical or similar elements.

BRIEF DESCRIPTION OF THE DRAWINGS

For better illustration of the features of the invention, some preferred embodiments are described hereunder, as examples without any limiting character, referring to the appended drawings, in which.

DETAILED DESCRIPTION OF VARIOUS EMBODIMENTS

The present invention is described hereunder making use of specific embodiments.

It should be noted that the term "comprising", as used for example in the claims, is not to be interpreted in a limiting sense, limiting to the elements, features and/or steps given thereafter. The term "comprising" does not exclude the presence of other elements, features or steps.

Thus, the scope of an expression "an object comprising the elements A and B" is not limited to an object that only contains the elements A and B. The scope of an expression "a method comprising the steps A and B" is not limited to a method which only contains the steps A and B.

In light of the present invention, these expressions only signify that the relevant elements or steps for the invention are the elements or steps A and B.

In the specification following hereunder, reference is made to "an embodiment" or "the embodiment". Such a reference signifies that a specific element or feature, described on the basis of this embodiment, is comprised in at least this one embodiment.

The presence of the terms "in an embodiment" or "in the embodiment" at different points in this description does not necessarily refer, however, to the same embodiment, although it may however indeed refer to one and the same embodiment.

Moreover, the properties or the features may be combined in any suitable way in one or more embodiments, as would be obvious to a person skilled in the art.

Figure 1:
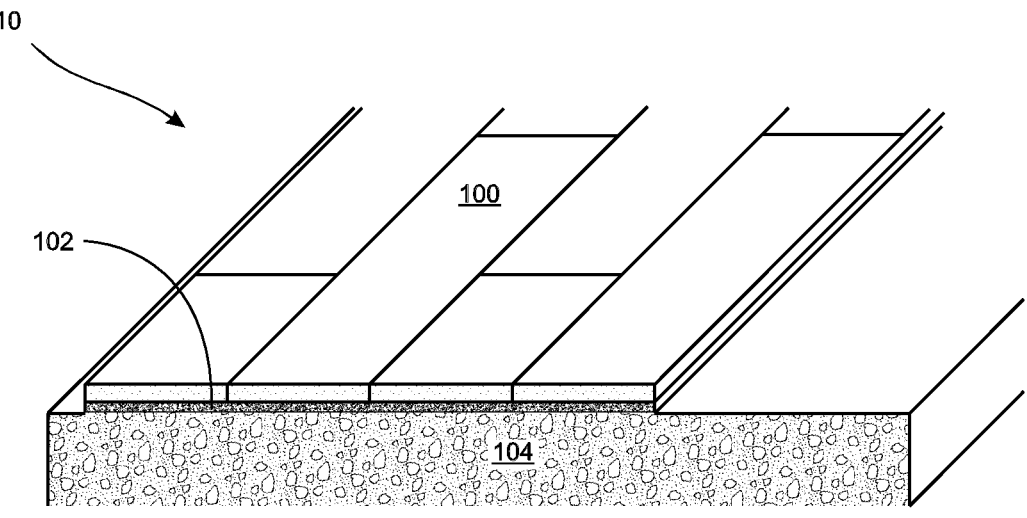
FIGS. 1 and 2 show floor coverings according to the invention.
Figure 2:
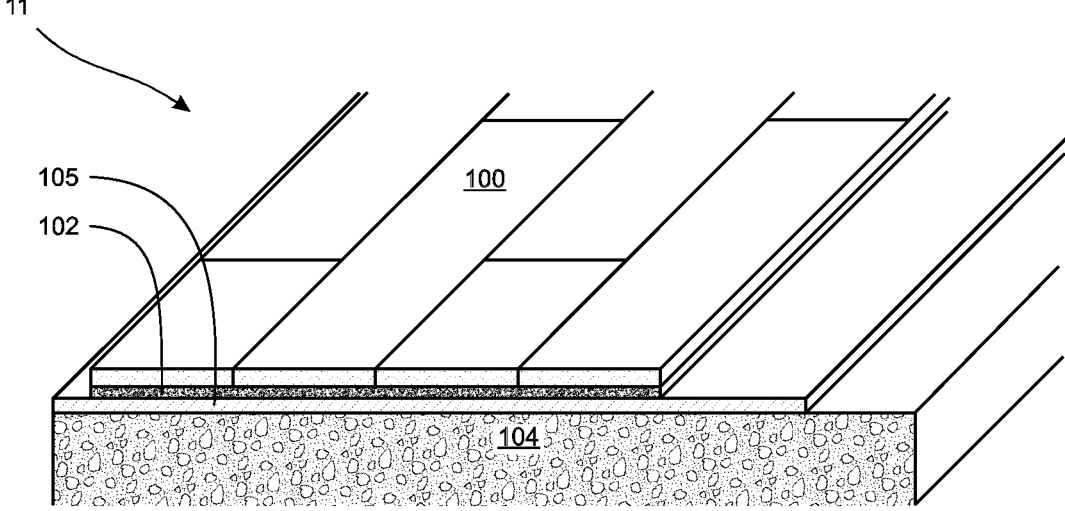

A floor covering 10 and 11 according to one aspect of the invention is shown in FIGS. 1 and 2. In FIG. 1, the floor covering 10 consists of floor elements laid side by side 100, which are attached with a nonpermanent glue 102 to the screed of an underlying supporting floor structure 104. The nonpermanent glue is a so-called tackifier, for example MAPEI Ultrabond eco Tack and was applied in an amount from 100 to 200 g/m$^2$. The individual floor elements 100 have the shape of a rectangle with dimensions 988 mm by 163 mm. These floor elements are explained further in FIG. 3.

In FIG. 2, the floor covering 11 consists of floor elements laid side by side 100, which are attached with a nonpermanent glue 102 to a subfloor 105. This subfloor 105 lies freely on the screed of an underlying supporting floor structure 104. The nonpermanent glue may be identical or similar in nature and amount as described for FIG. 1. The individual floor elements 100 have the shape of a rectangle with dimensions 988 mm by 163 mm. These floor elements are explained further in FIG. 3.

The subfloor is a subfloor made of foamed PU with a weight per unit area of 2.5 to 3 kg/m$^2$.

In an alternative, the floor elements may be glued to the screed with a permanent glue, for example a pressure sensitive adhesive (PSA glue). The glue is applied in an amount of 70 g/m$^2$.

Figure 3:
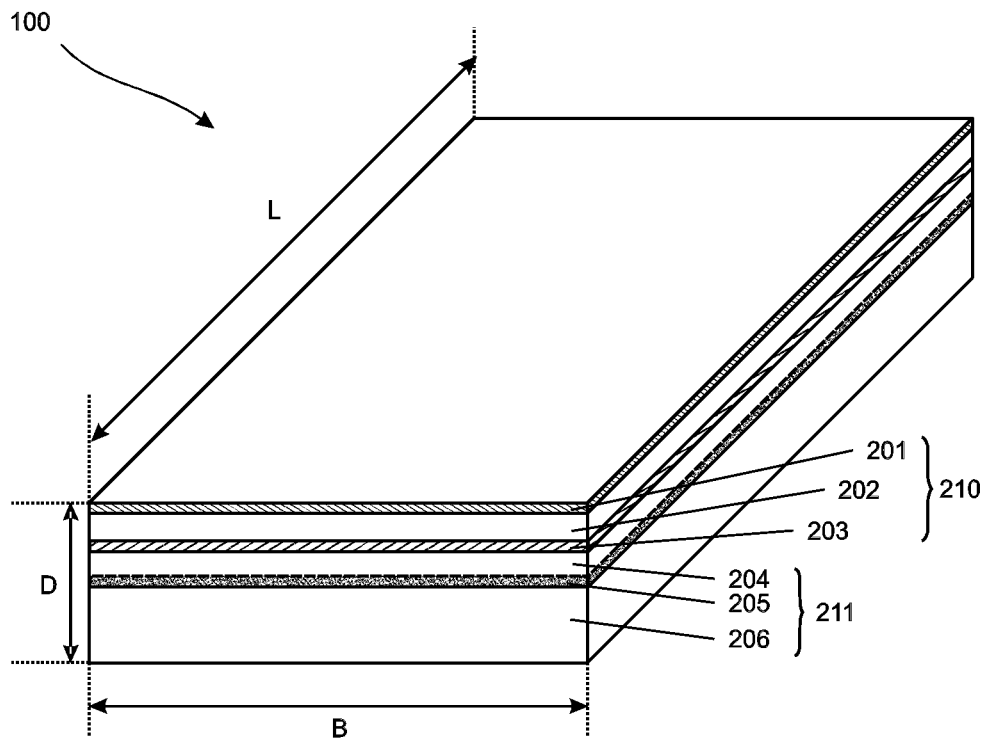
FIG. 3 shows a schematic cross section of a floor element according to the invention.

As shown in more detail in FIG. 3, the floor element 100 is a rectangular piece of sheet vinyl, with dimensions L being 988 mm B being 163 mm and thickness D of 2 mm. It has a weight per unit area of 2170 g/m$^2$. The floor element 100 is built up from a top layer 210, which itself consists of a heat-curing PU coating 201 of thickness 10 μm, located on a wearing layer 202 of flexible PVC (40 phr plasticizer) with a density of 1.2 to 1.3 g/cm$^3$ and thickness 0.3 mm. Under this wearing layer there is a decorative layer 203.

This top layer 210 lies on a substrate layer 211, which is itself also layered. The substrate 211 comprises flexible foamed PVC. On the upper side there is a layer 204 of flexible foamed PVC with a density from 0.5 to 0.8 g/cm$^3$ and a thickness of about 0.45 mm. The amount of plasticizer in this PVC is 60 phr, and it further comprises 40 wt % filler.

The filler is preferably white, so that this layer may preferably have a white color. This flexible foamed PVC may itself be built up from a number of layers of flexible foamed PVC (not shown in FIG. 3). In an alternative embodiment, this layer 204 is not foamed and it has a density from a good 1.6 to 1.6 g/cm³. The decorative layer 203 may be a very thin rigid PVC film provided with a decorative print, but in this embodiment it is a print that is printed directly on the upper side of the PVC layer 204.

On the underside of this flexible foamed PVC there is a layer 205 with a glass-fiber fleece with weight per unit area of 35 g/m², which acts as a reinforcing layer. This glass-fiber fleece is fully impregnated with flexible PVC and is about 0.3 mm thick.

The polymer used for this reinforcing layer is PVC with a density from 1.5 to 1.6 g/cm³, comprises a good 60 phr plasticizer and about 40 wt % filler. Underneath the substrate there is then a backlayer 206 that consists of flexible PVC about 0.95 mm thick, a 60 phr plasticizer and about 50 wt % filler. The layer may be foamed and have a density of a good 1 to 1.3 g/cm³, or may be unfoamed with a density from 1.5 to 1.9 g/cm³.

All PVC polymer has a K value between 50 and 90.

Figure 4:
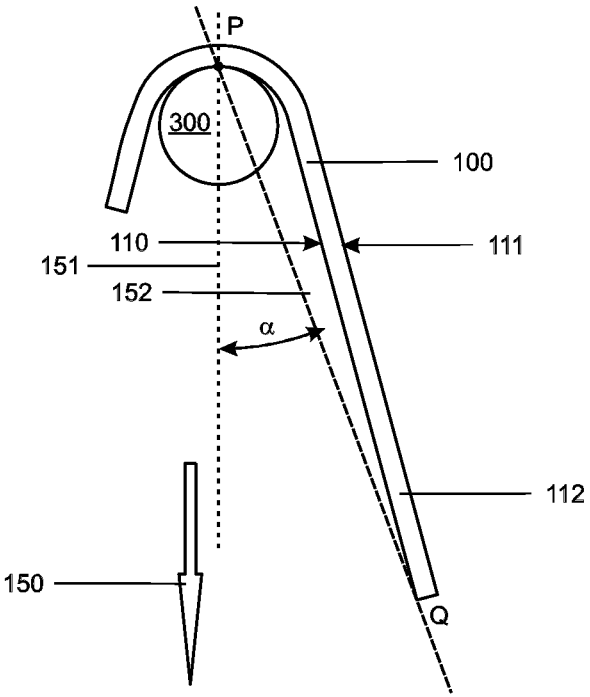
FIG. 4 shows schematically the test setup to which floor elements according to the invention are subjected.

This floor element 100 was tested for flexibility as shown in FIG. 4. The floor element 100 has an upper side and an underside, 111 and 110 respectively. On the underside and along the edge 112, points P and Q are defined. Point Q is the vertex of the rectangular floor element on the underside of the floor element. Point P lies at a distance of 40 cm from this point Q along the edge 112. The floor element is conditioned at 23° C. and 50% RH. It is suspended over a rod 300 with a diameter of 2 cm, as shown in FIG. 4. Point P is located in the vertical direction 150 at the highest point where the floor element touches the rod. In FIG. 4 on the right next to the rod, 40 cm of the floor element hangs freely under the action of gravity, which acts on this floor element in the vertical direction 150. Between the vertical line 151 through point P and the line 152 joining points P and Q (line PQ), an angle α is measured, after the floor element has had time to come to a stable hanging state. The angle measured for floor element 100 is 9°.

An alternative floor element is a floor element with the same dimensions and weight per unit area as described for the floor element 100. The alternative floor element is built up identically as shown in FIG. 3, but the wearing layer 202 has a thickness of 0.5 mm, whereas the backlayer 206 is only 0.75 mm thick. This embodiment has a weight per unit area of 2240 g/m².

Measurement of the angle as reproduced in FIG. 4 in this case gives an angle α of 7°.

It is clear that although the embodiments and/or the materials are discussed for supplying embodiments according to the present invention, various changes or modifications may be applied while remaining within the scope and/or the spirit of the present invention. The present invention is by no means limited to the embodiments described above, but may be implemented in accordance with different variants while remaining within the scope of the present invention.

The invention claimed is:

1. A polymer floor element comprising a decorative top layer on a substrate made of polymer,
   wherein the floor element has a rectangular or square surface with a longest side less than 3.0 m and greater than 0.4 m, for which it is valid that for a strip of the floor element with a first point Q defined as a vertex of the strip, and a point P at a distance of 40 cm with respect to Q along a side of the strip, suspended over a rod with diameter of 2 cm with its side on which P and Q are defined, perpendicular to an axis of the rod, so that
   P is located in a vertical direction at the highest point where the floor element touches the rod; and
   the strip, with point Q along one side, hangs down from the rod under the strip's own weight;
   a straight line PQ intersects the vertical through P at an angle less than 15°;
   wherein the floor element is sheet vinyl;
   wherein the sheet vinyl comprises a substrate layer comprising one or more flexible or semi-rigid PVC layers, and a finishing layer including a decorative layer and a wearing layer;
   wherein the wearing layer is a flexible or semi-rigid PVC layer;
   wherein the wearing layer includes more than 30 phr plasticizer;
   wherein the decorative layer is a printed layer, printed directly on the flexible or semi-rigid PVC layer of the substrate layer;
   wherein the flexible or semi-rigid PVC layer of the substrate layer and/or of the wearing layer is applied as a layer by means of PVC plastisol.

2. The polymer floor element of claim 1, wherein the floor element has a rectangular or square surface with a short side less than 0.5 m and greater than 0.08 m.

3. The polymer floor element of claim 1, wherein the floor element has a weight per unit area between 1500 g/m² and 3000 g/m².

4. The polymer floor element of claim 1, wherein the floor element has a thickness between 1 mm and 8 mm.

5. The polymer floor element of claim 1, wherein the polymer is polyvinyl chloride.

6. A floor covering comprising a plurality of floor elements of claim 1.

7. The floor covering of claim 6, wherein the floor elements are glued on a subfloor.

8. The floor covering of claim 7, wherein the floor elements are glued on a subfloor by means of a nonpermanent glue.

9. The floor covering of claim 7, wherein the subfloor is a foamed polymer subfloor.

10. The floor covering of claim 6, wherein the floor elements are glued on a supporting floor structure.

11. The floor covering of claim 10, wherein the floor elements are glued on the supporting floor structure by means of a nonpermanent glue.

12. A polymer floor element comprising a decorative top layer on a substrate made of polymer,
   wherein the floor element has a rectangular or square surface with a longest side less than 3.0 m and greater than 0.4 m,
   wherein said floor element passes a flexibility test according to ASTM F137 with a cylinder of 6 mm;
   wherein the floor element is sheet vinyl;
   wherein the sheet vinyl comprises a substrate layer comprising one or more flexible or semi-rigid PVC layers, and a finishing layer including a decorative layer and a wearing layer;
   wherein the wearing layer is a flexible or semi-rigid PVC layer;
   wherein the wearing layer includes more than 30 phr plasticizer;

wherein the decorative layer is a printed layer, printed directly on the flexible or semi-rigid PVC layer of the substrate layer;

wherein the flexible or semi-rigid PVC of the substrate layer and/or of the wearing layer is applied as a layer by means of PVC plastisol.

13. The polymer floor element of claim 12, wherein the floor element has a rectangular or square surface with a short side less than 0.5 m and greater than 0.08 m.

* * * * *